United States Patent Office

3,642,659
Patented Feb. 15, 1972

3,642,659
PROCESS FOR THE PRODUCTION OF BEAD-LIKE CATALYST SUPPORTS FOR HIGH MECHANICAL STRESSING
Ludwig Dorn, Cologne-Stammheim, Gerhard Heinze, Schildgen, and Ernst Podschus, Leverkusen, Germany, assignors to Farbenfabriken Bayer Aktiengesellschaft, Leverkusen, Germany
No Drawing. Filed May 21, 1969, Ser. No. 826,710
Claims priority, application Germany, June 12, 1968,
P 17 67 754.2
Int. Cl. B01j *11/82, 11/44, 11/40*
U.S. Cl. 252—435                                    7 Claims

ABSTRACT OF THE DISCLOSURE

Porous, abrasion-resistant bead-like catalyst supports for reactions in fluidised beds containing in a matrix of a silicon dioxide gel mixed with 0.1 to 3% by weight of magnesium oxide, a silicon dioxide filler with a specific surface area of 20 to 200 m.$^2$/g. according to BET in quantities of from 20 to 60% by weight and an argillaceous mineral from the group comprising kaolinite, montmorillonite and attapulgite in quantities of from 5 to 30% by weight, both quantities being related to the dry granulated material. The catalyst supports are obtained by suspending the silicon dioxide filler and the argillaceous mineral in the aforesaid quantities in an aqueous, stable silicon dioxide sol with a specific surface area of 150 to 400 m.$^2$/g. according to BET and gelling the liquid suspension by the addition of hydrated finally divided magnesium oxide in quantities of 0.1 to 3% by weight and feeding this gellable mixture in droplet form into a liquid which is immiscible with water and finally separating the sulphated granulated material from the liquid and driving and hardening the bead-like granulated material for at least 10 minutes at a temperature of from 500 to 1000° C.

---

The present invention relates to bead-like abrasion-resistant catalyst supports and a process for the production thereof. The catalyst supports contain in a matrix of a silica gel amounts of a silicon dioxide filler and an argillaceous mineral of the group kaolinite, montmorillonite or attapulgite. The catalyst is suitable for use in fixed bed processes and especially in fluidised processes.

Particular standards have to be set in many respects for catalyst supports. In the first place, the skeleton substance as such must not develop any catalytic side effects. Secondly, a pore structure must be present, which permits a uniform saturation with the catalytically active components and subsequently guarantees a rapid gas diffusion from the surface of the granulated material to the active centres in the interior, and vice versa. Finally, a mechanical resistivity is required, which must also be maintained after the saturation and when being used under processing conditions. Hardness and resistance to abrasion play an important part, especially with catalysts for a fluidised bed or fluid bed.

Catalyst supports are usually produced by compressing kieselguhr, silica gel, bentonites and bleaching earths, the initial mixture formed into a paste by adding water and possibly binders being shaped by means of granulating apparatus, and the shaped elements being dried and subjected for hardening purposes to a heat treatment. Apart from the fact that it is difficult, according to these processes, to produce support bodies which are suitable as regards shape and size for use in a fluidised bed, the mechanical strength of these bodies is also usually insufficient for this purpose.

A process for the production of gel granules, advantageously in bead form, which contain silicon dioxide, is known, the process being based firstly on a sodium silicate solution and secondly on a dilute sulphuric acid or aluminium sulphate solution. The unstable hydrosol which is formed when the components are combined and which has an effective life of at the most a few seconds is distributed in drop form in an organic phase, in which it solidifies to gel granules (German Pat. No. 896,189). This process serves for the production of cracking catalysts. It is also known to improve the abrasion on such bead-like granulated materials by dispersion of finely divided solid additives in the hydrosol, the additives having a mean particle diameter, determined by weighing, which is between 1 and 5$\mu$ (U.S. Pat. No. 2,900,349). These processes can also be used for the production of catalyst supports, but a number of disadvantages have been found in this connection.

The neutral salt formed stoichiometrically during production remains included in the beads and has to be dissolved out before the further processing by means of a troublesome washing process. Otherwise sintering occurs during the calcination. Furthermore, the short life of the hydrosol makes difficult the production of the small beads required for fluidised bed reactions by mechanical dispersion of the hydrosol in the organic phase using nozzles, centrifuging discs, and so on, because of the danger of a sol-gel transformation taking place prematurely. Finally, the gel granules produced from the unstable hydrosol are positively formed with a high specific surface of 200 to 500 m.$^2$/g., according to BET, and a high proportion of very close pores, and consequently have a comparatively low absorption capacity for liquids. Furthermore, the highly active gel itself develops specific catalytic effects, so that concurrent reactions and especially cracking reactions take place.

In order partially to overcome these defects, the gel granules are frequently subjected to a heat treatment in a steam atmosphere, whereby the specific surface and the cracking activity are reduced and the proportion of additional pores and thus the absorptive capacity for liquids are increased. In addition to these desirable modifications, however, the steam treatment results in a reduction in the mechanical strength.

Furthermore, a process is known for stirring pulverous solids with an aqueous stable silica sol of 150 to 400 m.$^2$/g. specific surface (according to BET) into a flowable suspension with a pH value below 10, mixing this suspension with comparatively small quantities of a second suspension of finely divided magnesium oxide in water and dispersing in drop form the gellable mixture of the two suspensions, before the sol-gel transformation is started, in a liquid which is immiscible with water (British patent specification No. 986,596). Since a stable silica sol with a definite size of the colloid particles is used according to this process, it is certainly possible to build up a large-pore silica gel skeleton in the granulated materials, but it has been shown that the mechanical properties of these beads are variable within wide limits, depending on the nature and quantity of the pulverous solids which are used, and in most cases do not in any way satisfy the conditions required of catalyst supports as regards absorptive power for liquids and resistance to abrasion. In addition, the rheological properties of the initial suspension are generally also unsuitable for a distribution as extremely fine droplets, such as those necessary for the production of fluid bed catalysts.

The present invention relates to a process for the production of porous, abrasion-resistant, bead-like catalyst supports which contain silicon dioxide predominantly by suspending solid substances in an aqueous, stable silicon dioxide sol with a specific surface of from 150 to 400 m.$^2$/g. according to BET; mixing the suspension thereby obtained with an aqueous paste of hydrated magnesium oxide in amounts of from 0.1 to 3% by weight of MgO, related to the water-free granulated material; dividing this gellable mixture into drops of the required size; gelling these drops in a liquid which is immiscible with water; separating the granulated material from the liquid; drying and calcining. According to the invention, the silicon dioxide sol has suspended therein a silicon dioxide-containing filler with a specific surface of from 30 to 200 m.$^2$/g. according to BET in a quantity of from 20 to 60% by weight, calculated on the anhydrous granulated material, and an argillaceous material such as kaolinite, montmorillonite or attapulgite in a quantity of from 5 to 30% by weight; the suspension obtained is gelled by the addition of hydrated, finely divided magnesium oxide and the dispersion of the suspension in droplet form in a medium immiscible with water to form a bead-like granular material; the latter matter is thereafter dried and calcined for at least 10 minutes at a temperature of from 500 to 100° C.

The present invention relates furthermore to porous, abrasion-resistant bead-like catalyst supports containing in a matrix of a silicon dioxide gel mixed with 0.1 to 3% by weight of magnesium dioxide, a silicon dioxide filler with a specific surface area of 20 to 200 m.$^2$/g. according to BET in quantities of from 20 to 60% by weight and an argillaceous mineral from the group comprising kaolinite, montmorillonite and attapulgite in quantities of from 5 to 30% by weight, both quantities being related to the dry granulated material. The catalyst supports are obtained by suspending the silicon dioxide filler and the argillaceous mineral in the aforesaid quantities in an aqueous, stable silicon dioxide sol with a specific surface area of 150 to 400 m.$^2$/g. according to BET and gelling the liquid suspension by the addition of hydrated finally divided magnesium oxide in quantities of 0.1 to 3% by weight and feeding this gellable mixture in droplet form into a liquid which is immiscible with water and finally separating the sulphated granulated material from the liquid and drying and hardening the bead-like granulated material for at least 10 minutes at a temperature of from 500 to 1000° C. The catalyst supports are highly useful in all fluidised bed processes where mainly silicon dioxide catalyst supports are suitable. The new catalyst supports were utilized with very good results in the catalytic conversion of $SO_2$ to $SO_3$. For this purpose the catalyst supports were treated with a potassium vanadate solution and thereafter heated for time sufficient to transform the vanadate into $V_2O_5$. The vanadium charge of the catalyst support should be in the range of 3 to 10% by weight based on $V_2O_5$.

By means of the process according to the invention, porous, abrasion-resistant and bead-like catalyst supports based on silicon dioxide are produced, which are suitable for saturation with metal salts and mineral acids while maintaining the required mechanical strength properties.

By fillers containing silicon dioxide within the terms of the invention is meant synthetic silicon dioxide with a large surface obtained by precipitation from an alkali silicate solution, which, by contrast with the silicon dioxide gels, has a flaky secondary structure. If the precipitation from the sodium silicate solution is, for example, effected with acids, silicon dioxide fillers are formed which at the most contain only small quantities of metal compounds, expressed analytically as metal oxides. In contrast, if solutions of alkaline earth or aluminum salts are used for the precipitation, the fillers obtained in this way contain the corresponding metal oxides, particularly CaO and $Al_2O_3$, respectively. Silicon dioxide is however the main constituent in every case. With the production of the silicon dioxide fillers, it is readily possible within wide limits to influence the primary particles and thus the specific surface and the secondary structure by the concentration and temperature of the solutions, and also by the speed of precipitation, the intensity of the stirring operation, and so on.

Fillers which contain silicon dioxide and which have a specific surface of 20 to 200 m.$^2$/g. according to BET are suitable for the process according to the invention Fillers with a lower specific surface than 20 m.$^2$/g. are just as little suited to the production of the support materials according to the invention as the corresponding natural products, such as diatomaceous earth or kieselguhr, whose specific surface is in the range of from about 5 to 25 m.$^2$/g. Granulated materials produced therefrom have inadequate strength values. On the other hand, fillers with higher BET values than 200 m.$^2$/g. are not very suitable for the process, since in many cases, they catalyse undesirable secondary reactions because of their extremely high activity.

The fillers with a specific surface of from 20 to 200 m.$^2$/g. which are to be used in the process according to the invention consist, when examined under a microscope, of loose flakes (secondary particles) with a diameter in the range of from 1 to about 30$\mu$. These secondary particles are also important in respect of the particle diameters determined by the sedimentation methods, e.g. according to Andreasen. A simple and rapid method for the rough characterisation of a filler consists in determining the so-called sediment volume. For this purpose, 2 g. of filler are dispersed in 98 g. of toluene by shaking and then allowed to settle. Using this procedure, the fillers to be used in the process according to the invention have sediment volumes of from 10 to 50 ml. However, there is no strict relationship between secondary particle size and specific surface and the property last mentioned constitutes the feature which can be established accurately in respect of the activity of fillers.

With the novel process, the silica sol suspension has also added thereto argillaceous minerals such as kaolinite, montmorillonite and attapulgite, in addition to the fillers which contain silicon dioxide. Apart from the fact that these additions of ceramic binders increase quite substantially the mechanical strength of the prepared support bodies after being dried and calcined, they also improve the "green" stability of the still moist beads and consequently facilitate the handling of the granulated material up to the drying stage on filtering and transport arrangements. Attapulgite in particular gives a considerable dimensional stability to the still wet granules. We have observed that granules which, related to anhydrous substance, contain at least 5% of kaolin or attapulgite, show a much smaller degree of shrinkage in the drying operation than those produced only with silicon dioxide fillers. With the shrinkage of gel-like structures, stresses and cracks were caused, which reduced the strength of the dried shaped bodies.

As argillaceous materials, it is preferable not to use the crude, impure products from the pit, but processed and washed qualities of such materials. As regards the kaolins, suitable commercial products are, for example, washed minerals with a high kaolinite content, known as "China clay." The bentonites available commercially are considered as a source for clays of the montmorillonite type, provided they had not been modified by acid treatment.

The quantity of the solids to be suspended in the silica sol is such that, related to anhydrous substance, there are present 20 to 60% by weight, and advantageously 35 to 50% by weight, of silicon dioxide fillers and 5 to 30% by weight, and advantageously 15 to 25% by weight, of argillaceous minerals, as well as the $SiO_2$ from the silica sol. The suspensions of the solid substances in the silica sol generally have a stability of several hours, which is sufficient for the further processing. The conversion of the suspensions into bead-like granules is effected in a manner known per se by adding a small quantity of an aqueous suspension of finely divided magnesium oxide as a gelling reagent and dropwise dispersion of the suspension in an organic, water-immiscible phase until the sol-gel transformation takes place. The dispersion of very small drops, such as is necessary for the production of catalyst supports for the fluid bed, is possible by using centrifuging discs or similar devices, which accelerate the liquid film by centrifugal forces. The addition of argillaceous minerals to the suspension has also proved to be beneficial, because of the influence on the rheological properties thereof, the stripping behaviour of the liquid streams and thus the production of micro-spheres with a more uniform grain fraction.

The granules are then dried and subjected to a heat treatment for at least 10 minutes at 500 to 1000° C. A considerable increase in strength is then observed. Stable silicon dioxide sols with a specific surface of 150 to 400 m.$^2$/g. and an $SiO_2$ content of 15 to 40% by weight are suitable for preparing the suspension. The hydrated, finely divided magnesium oxide has a specific surface of about 50 m.$^2$/g. according to BET. It is obtained by suspending in water finely divided magnesium oxide, such as that obtainable commercially under the names "Magnesia Usta" or "Magnesia Usta Extraleicht." Particularly active finely divided magnesium oxide can also be obtained by careful thermal decomposition of precipitated basic magnesium carbonate. For the gelling operation, magnesium oxide quantities of 0.1 to 3% by weight, calculated on the dried granules, are generally sufficient.

Organic, water-immiscible liquids, for example, liquid hydrocarbons or chlorinated hydrocarbons, e.g. perchlorethylene, trichloroethylene and o-dichlorobenzene, alone or as mixtures, are suitable as media for the sol-gel transformation.

After the cooling operation, the support materials prepared according to the invention can be impregnated with aqueous solutions of active components, e.g. metal salts and mineral acids. It is a characteristic of the products according to the new process that they can take up heavy charges of acids. Thus, for example, the hardness and abrasion resistance of a bead granulated material prepared according to the invention remain unchanged up to a loading with 25 parts by weight of $H_3PO_4$, related to 100 parts of anhydrous support substance. In addition, the strength of the support, e.g. by impregnation with a potassium vanadate solution having a strongly alkaline reaction, is not reduced, although at least partial dissolution of the silica gel proportion should be expected.

A flow method in which the granules which are continuously circulating are thrown against a baffle cone by an air jet issuing from a nozzle is used for establishing the abrasion resistance of the granules. The apparatus consists of a vertically disposed outer glass tube with an internal diameter of 50 mm. and a concentric inner tube with an internal diameter of 6 mm. and a length of 280 mm. A capillary with a width of 2 mm. and a length of 140 mm. is fitted into the bottom of the inner tube as a nozzle. A baffle cone is arranged at a distance of 30 mm. above the outlet of the 6 mm. wide tube. For determining the abrasion, 100 ml. of the specimen are separated from the fine fraction by means of a test sieve DIN 4188, with a mesh size of 400$\mu$, weighed out and introduced into the apparatus. An air stream of 3 m.$^3$/h. (at n.t.p.) is sent through the nozzle. The granules drawn in by injector action are thrown against the baffle cone and then drop back again towards the nozzle in the outer annular space. After one hour, the stream of air is stopped, and the granules are freed on the same test sieve from the fine fraction and re-weighed. The percentage loss by weight is indicated as abrasion.

The following examples are given to explain more fully the present invention.

EXAMPLE 1

4800 g. of pure silicon dioxide filler precipitated from a sodium silicate solution with sulphuric acid and 2400 g. of kaolin were suspended by means of an intensive mixer in 10 litres of aqueous silica sol (density 1.20 g./ml., 30% by weight of $SiO_2$) with a specific surface according to BET of 200 m.$^2$/g. The silicon dioxide filler had a BET value of 36 m.$^2$/g. and a sediment volume in toluene of 25 ml. The calculated composition of the suspension, related to dry substance, was:

33% by weight of $SiO_2$ from silica sol,
45% by weight of silicon dioxide filler,
22% by weight kaolin.

Using proportioning pumps, quantities of 8 l./hour of the suspension and 0.8 l./hour of an aqueous magnesium oxide suspension (80 g. MgO/l.) were continuously supplied to a mixing vessel from which the gellable mixture of two suspensions was discharged in a stream onto a rotating distributor device. This device was a vessel becoming wider conically downwards and having a series of holes immediately above the bottom of the vessel, the bottom being a few centimetres above the liquid surface of a column filled with o-dichlorobenzene. By altering the speed of rotation, the size of the drops being formed, which solidified in the organic phase by sol-gel transfomation into beads, could be controlled in such a way that the mixture was mainly divided into drops of from 0.5 to 1.5 mm.

The still soft granulated material was separated from the o-dichlorobenzene, dried in a stream of air and then heated for 2 hours to 700° C. The yield of beads with diameters between 0.5 and 1.5 mm. amounted to 96% by weight. The bead-like catalyst supports thus obtained had a specific surface of 69 m.$^2$/g. according to BET and showed a loss by abrasion of 1.3%.

The liquid absorption capacity, which is important for the saturation with solutions of catalytically active substances, was also established in respect of the bead-like support material. For this purpose, 100 g. of the granulated material were left standing while covered with water, thereafter extracted by suction on a large-pored glass frit and briefly dried between two discs of filter paper, and the increase in weight was then determined by weighing. The water absorption amounted to 52 g. per 100 g. of granulated material.

EXAMPLE 2

1 litre (=635 g.) of the support material prepared in Example 1 were introduced into 1300 ml. of a potassium vanadate solution, containing 200 g. of $V_2O_5$ and 247 g. of KOH, and left standing for 2 hours in the cold while stirring occasionally. The granulated material was then abruptly filtered off on a suction filter, dried in air and thereafter heated for 2 hours up to 500° C. The vanadium content of the heated product was 5.7% of $V_2O_5$.

The catalyst support charged with vanadium was sulphated in the manner usual with sulphuric acid catalysts at 450° C. with weak gases containing $SO_2$ and thereafter used for the catalytic oxidation of $SO_2$ to $SO_3$ in a fluidised bed. With 8.9% $SO_2$ containing roasting gas at a working temperature of 500° C., conversions of 89 to 90% were obtained, while at 450° C., conversions of 75 to 83% were obtained, with residence times of about 0.5 second.

The vanadium-containing granulated material extracted from the catalyst apparatus showed a value of 0.8% in the abrasion test.

EXAMPLE 3

The following solids were suspended in 10 litres of the same silicon dioxide sol as in Example 1 for the production of another catalyst support:

(a) 2,220 g. of a pure silicon dioxide filler, prepared by precipitating a sodium silicate solution with sulphuric acid, having a BET value of 34 m.$^2$/g., a sediment volume in toluene of 20 ml. and a mean particle diameter determined by weighing of 7$\mu$.

(b) 2,220 g. of a calcium-containing silicon dioxide filler, prepared by the precipitation of a sodium silicate solution with a solution of $CaCl_2$ in hydrochloric acid, and having a content of 8% CaO, a BET value of 50 m.$^2$/g., a sediment volume in toluene of 40 ml. and a mean particle diameter determined by weighing of 7.5$\mu$.

(c) 2,220 g. of kaolin with a mean particle diameter determined by weighing of 6.3$\mu$.

The suspension was processed as in Example 1 into beads with a diameter of 0.5 to 1.5 mm. After drying and heating for 2 hours at 700° C., the granulated material has a specific surface of 75 m.$^2$/g. according to BET, an abrasion value of 1.6% and a water absorption capacity of 46 g. per 100 g. of granulated material.

The dried granulated material was impregnated with phosphoric acid and heated for 2 hours at 600° C. The granulated material contained 20% by weight of anhydrous phosphoric acid and showed an abrasion value of 0.5%.

EXAMPLE 4

For another catalyst support, attapulgite was used as argillaceous mineral. In 10 litres of the same silicon dioxide sol as in Example 1, the following solids were suspended:

(a) 3,400 g. of pure silicon dioxide filler, as in Example 3,
(b) 2,200 g. of calcium-containing silicon dioxide filler, as in Example 3,
(c) 1,500 g. of attapulgite with a mean particle size determined by weighing of 13$\mu$ and the following chemical composition:

|  | Percent |
|---|---|
| $SiO_2$ | 69.9 |
| $Al_2O_3$ | 12.4 |
| MgO | 11.2 |
| $Fe_2O_3$ | 4.1 | and others.

The bead-like support material produced therefrom as in Example 1 had a specific surface of 50 m.$^2$/g. according to BET, an abrasion value of 1.5% and a water absorption capacity of 50%, after being dried and heated for two hours at 500° C.

What is claimed is:

1. A process for the production of porous, abrasion-resistant bead-like catalyst supports which process comprises suspending a solid in an aqueous stable silicon dioxide sol with a specific surface area of 150 to 400 m.$^2$/g., which solid comprises (a) a silicon dioxide filler with a specific surface area of from 20 to 200 m.$^2$/g. in quantities of from 20 to 60% by weight and (b) an argillaceous mineral selected from the group consisting of kaolinite, montmorillonite and attapulgite in quantities of from 5 to 30% by weight, based on the total solids in the sol; mixing the resulting suspension with hydrated magnesium oxide in quantities of from 0.1 to 3% by weight based on the total solids in the sol; dividing the resulting gelable mixture in droplet form in a water-immiscible liquid to effect gelation of the droplets; separating the dry solid material from the liquid and drying and heating the resulting bead-like granulated material for at least ten minutes at temperatures of from 500 to 1000° C.

2. Process as claimed in claim 1, wherein said silicon dioxide filler is used in an amount of 35 to 50% by weight, and the argillaceous mineral is used in an amount of from 15 to 25% by weight, both based on total solids in the sol.

3. Process as claimed in claim 1, wherein the catalyst supports obtained are charged with a solution of phosphoric acid.

4. Process as claimed in claim 3, wherein the catalyst supports are charged with vanadium pentoxide.

5. Porous, abrasion-resistant bead-like catalyst supports containing in a matrix of a silicon dioxide gel mixed with 0.1 to 3% by weight of hydrated magnesium oxide (a) silicon dioxide filler with a specific surface area of 20 to 200 m.$^2$/g. in quantities of from 20 to 60% by weight and (b) an argillaceous mineral selected from the group consisting of kaolinite, montmorillonite and attapulgite in quantities of from 5 to 30% by weight, both quantities based on total contained solids.

6. Porous, abrasion-resistant bead-like catalyst supports as claimed in claim 5, in which the silicon dioxide filler is present in an amount of from 35 to 50% by weight and the argillaceous mineral in an amount of from 15 to 25% by weight.

7. Porous, abrasion-resistant bead-like catalyst supports as claimed in claim 5, wherein the silicon filler has a sediment volume of from 10 to 50 mm.

References Cited

UNITED STATES PATENTS

| 2,727,868 | 12/1955 | Simpson et al. | 252—451 X |
| 2,900,349 | 8/1959 | Schwartz | 252—451 X |
| 3,186,794 | 6/1965 | Davies | 252—451 X |

FOREIGN PATENTS

| 986,596 | 3/1965 | Great Britain | 252—448 |

CARL F. DEES, Primary Examiner

U.S. Cl. X.R.

252—448, 451, 455 R, 457

PO-1050
(5/69)

UNITED STATES PATENT OFFICE
CERTIFICATE OF CORRECTION

Patent No. 3,642,659            Dated February 15, 1972

Inventor(s) Ludwig Dorn, et al.

It is certified that error appears in the above-identified patent and that said Letters Patent are hereby corrected as shown below:

Col. 3, line 18

"100°" should be --1000°--

Signed and sealed this 11th day of July 1972.

(SEAL)
Attest:

EDWARD M.FLETCHER, JR.            ROBERT GOTTSCHALK
Attesting Officer            Commissioner of Patents